United States Patent
Marley et al.

(10) Patent No.: US 12,001,689 B2
(45) Date of Patent: *Jun. 4, 2024

(54) TRANSPARENTLY ATTACHED FLASH MEMORY SECURITY

(71) Applicant: Microchip Technology Incorporated, Chandler, AZ (US)

(72) Inventors: Brian J. Marley, Smithtown, NY (US); Richard E. Wahler, Saint James, NY (US)

(73) Assignee: Microchip Technology Incorporated, Chandler, AZ (US)

( * ) Notice: Subject to any disclaimer, the term of this patent is extended or adjusted under 35 U.S.C. 154(b) by 145 days.

This patent is subject to a terminal disclaimer.

(21) Appl. No.: 17/133,115

(22) Filed: Dec. 23, 2020

(65) Prior Publication Data

US 2021/0117109 A1 Apr. 22, 2021

Related U.S. Application Data

(63) Continuation of application No. 16/218,773, filed on Dec. 13, 2018, now Pat. No. 10,877,673.

(Continued)

(51) Int. Cl.
*G06F 3/06* (2006.01)
*G06F 1/10* (2006.01)
(Continued)

(52) U.S. Cl.
CPC .............. *G06F 3/0622* (2013.01); *G06F 1/10* (2013.01); *G06F 3/0659* (2013.01);
(Continued)

(58) Field of Classification Search
CPC ........ G06F 13/16; G06F 21/85; G06F 3/0622; G06F 3/0679; G06F 3/0659; G06F 1/10; G06F 3/06
See application file for complete search history.

(56) References Cited

U.S. PATENT DOCUMENTS 8,669,607 B1  3/2014  Tsair et al. ................... 257/316
9,111,401 B2  8/2015  Dansachmueller et al.
(Continued)

FOREIGN PATENT DOCUMENTS

CN    102541469 A    7/2012    ............. G06F 11/14
JP     07073110 A    3/1995    ............. G06F 12/14
(Continued)

OTHER PUBLICATIONS

"IEEE Standard for Discovery, Authentication, and Authorization in Host Attachments of Storage Devices—Redline," in IEEE Std 1667-2015 (Revision of IEEE Std 1667-2009)—Redline, vol. No., pp. 1-663, Jan. 22, 2016.*

(Continued)

*Primary Examiner* — Pierre Michel Bataille
(74) *Attorney, Agent, or Firm* — SLAYDEN GRUBERT BEARD PLLC

(57) ABSTRACT

An apparatus includes an interface circuit and a monitor circuit communicatively coupled to the interface circuit. The monitor circuit is configured to identify a command issued to a memory communicatively coupled to the monitor circuit through the interface circuit, determine whether the command is authorized, and, based on a determination that the command is not authorized, cancel the command.

18 Claims, 9 Drawing Sheets

Related U.S. Application Data

(60) Provisional application No. 62/599,288, filed on Dec. 15, 2017.

(51) Int. Cl.
    *G06F 13/16* (2006.01)
    *G06F 21/85* (2013.01)

(52) U.S. Cl.
    CPC ............ *G06F 3/0679* (2013.01); *G06F 13/16* (2013.01); *G06F 21/85* (2013.01)

(56) References Cited

U.S. PATENT DOCUMENTS

| | | | |
|---|---|---|---|
| 9,503,922 | B1 | 11/2016 | Ford et al. |
| 10,606,773 | B2 | 3/2020 | Condict et al. |
| 10,877,673 | B2 | 12/2020 | Marley et al. |
| 2005/0193182 | A1 | 9/2005 | Anderson et al. ............ 711/163 |
| 2006/0106917 | A1* | 5/2006 | Lambourn .......... G06F 21/6218 710/240 |
| 2006/0112246 | A1* | 5/2006 | Boning ............... G06F 12/1483 711/163 |
| 2008/0162784 | A1 | 7/2008 | Obereiner et al. ............ 711/103 |
| 2008/0167970 | A1 | 7/2008 | Nissim ...................... 705/26.35 |
| 2008/0282017 | A1 | 11/2008 | Carpenter et al. ............ 710/316 |
| 2009/0235336 | A1 | 9/2009 | Sueyoshi et al. .................. 726/4 |
| 2010/0246280 | A1* | 9/2010 | Kanda .................... G11C 5/143 327/143 |
| 2011/0066839 | A1* | 3/2011 | Wang ...................... H04L 9/321 726/19 |
| 2011/0296133 | A1* | 12/2011 | Flynn .................... G06F 3/0652 711/171 |
| 2012/0066499 | A1* | 3/2012 | Ali ........................ G06F 21/305 713/170 |
| 2013/0305028 | A1 | 11/2013 | Mo et al. ........................... 713/2 |
| 2014/0281286 | A1* | 9/2014 | Lim ...................... G06F 12/145 711/152 |
| 2016/0127492 | A1* | 5/2016 | Malwankar ......... H04L 67/1097 709/212 |
| 2016/0342533 | A1 | 11/2016 | Shan ............................. 711/152 |
| 2017/0046525 | A1 | 2/2017 | Balinsky et al. ................ 726/29 |
| 2017/0075824 | A1 | 3/2017 | Haen et al. ..................... 711/103 |
| 2017/0103991 | A1 | 4/2017 | Kim et al. ..................... 438/258 |
| 2018/0189199 | A1 | 7/2018 | Condict et al. |
| 2018/0322069 | A1* | 11/2018 | Heinrich ................ G06F 21/85 |
| 2019/0034910 | A1* | 1/2019 | Gardner ............... G06Q 20/341 |

FOREIGN PATENT DOCUMENTS

| | | | | |
|---|---|---|---|---|
| WO | WO-2007145366 | A1 * | 12/2007 | ......... G06K 7/10811 |
| WO | 2017/131671 | A1 | 8/2017 | ............. G06F 12/14 |
| WO | WO-2019045796 | A1 * | 3/2019 | ......... G06F 13/1652 |

OTHER PUBLICATIONS

Taiwan Office Action, Application No. 107145282, 13 pages.
"IEEE Standard for Discovery, Authentication, and Authorization in Host Attachments of Storage Devices," IEEE Standards Association, pp. 1-230, Jan. 22, 2016.
International Search Report and Written Opinion, Application No. PCT/US2018/065616, 10 pages, dated Mar. 26, 2019.
Japanese Office Action, Application No. 2020-532611, 6 pages, dated Dec. 6, 2022.
Chinese Office Action, Application No. 201880067430.1, 22 pages, dated Feb. 14, 2023.

* cited by examiner

TRANSPARENTLY ATTACHED FLASH MEMORY SECURITY

CROSS-REFERENCE TO RELATED APPLICATIONS

This application is a continuation of U.S. application Ser. No. 16/218,773 filed on Dec. 13, 2018, and claims benefit of U.S. Provisional Application No. 62/599,288 filed on Dec. 15, 2017, which are incorporated herein in their entirety.

APPLICATION PRIORITY

This application claims priority to U.S. Provisional Patent Application No. 62/599,288 filed Dec. 15, 2017, the contents of which are hereby incorporated in their entirety.

FIELD OF THE INVENTION

The present disclosure relates to the control and security of flash memory for electronic devices and, more particularly, to transparently attached flash memory security.

BACKGROUND

Flash memory is non-volatile memory that is used for storage and for transferring data between computing devices and elements thereof. Flash memory has the ability to be electronically reprogrammed and erased. Flash memory may be implemented in electronic or computing devices such as universal serial bus ("USB") drives, portable music players, smart phones, digital cameras, or solid-state drives.

Flash memory may be a type of electronically erasable programmable read only memory ("EEPROM"). Flash memory may implement a standalone memory storage device such as a USB jump drive. EEPROM is a type of data memory device using an electronic device to erase or write digital data. Flash memory may be a distinct subtype of EEPROM, which is programmed and erased in large blocks.

Contents of EEPROM may be prone to unauthorized read or write operations. For example, a virus may install hacks into firmware stored on EEPROM in an unauthorized write. In another example, a virus may access sensitive content in an unauthorized read. Flash memory or flash memory controllers, as common examples of EEPROM, may lack native hardware-based protection or real-time protection against such unauthorized read or write operations. Embodiments of the present disclosure may provide hardware-based protection or real-time protection against unauthorized read or write operations.

SUMMARY

Embodiments of the present disclosure include an apparatus. The apparatus includes an interface circuit and a monitor circuit communicatively coupled to the interface circuit. The monitor circuit may be configured to identify a command issued to a memory communicatively coupled to the monitor circuit through the interface circuit, determine whether the command is authorized, and, based on a determination that the command is not authorized, cancel the command. In combination with any of the above embodiments, the monitor circuit may be further configured to, in order to cancel the command, cause the monitor circuit to modify a received chip select signal to yield a modified chip select signal, and send the modified chip select signal to the memory. In combination with any of the above embodiments, the monitor circuit may be further configured to, in order to cancel the command, add a clock pulse to a clock bus used by the memory before completion of the modified chip select signal. In combination with any of the above embodiments, the monitor circuit may be further configured to, in order to cancel the command, reset a source of the command before the clock pulse is added to the clock bus used by the memory. In combination with any of the above embodiments, the monitor circuit may be further configured to, in order to cancel the command, reset a source of the command before completion of the modified chip select signal. In combination with any of the above embodiments, the monitor circuit may be further configured to, in order to cancel the command, complete the modified chip select signal after completion of the received chip select signal. In combination with any of the above embodiments, the monitor circuit may be further configured to, in order to cancel the command, complete the modified chip select signal in response to a determination that the command is a write command or an erase command. In combination with any of the above embodiments, the monitor circuit may be further configured to, in order to cancel the command, complete the modified chip select signal before a later chip select signal from a source of the command is received. In combination with any of the above embodiments, the monitor circuit may be further configured to, in order to cancel the command, complete the modified chip select signal before receiving a later chip select signal from the source of the command based on a determination that the command is a read command. In combination with any of the above embodiments, the monitor circuit may be further configured to identify a read command issued to a memory communicatively coupled to the monitor circuit, compare content from the memory with a trusted copy to determine whether the content from the memory and the trusted copy are identical, and, based on a determination that the content from the memory is not the same as the trusted copy, take corrective action. In combination with any of the above embodiments, the monitor circuit may include a processor and a non-transitory, machine-readable medium. The medium may include instructions that, when loaded and executed by the processor, cause the monitor circuit to identify the command issued to a memory communicatively coupled to the monitor circuit, determine whether the command is authorized, and cancel the command.

Embodiments of the present disclosure may include methods performed by any of the monitor circuits of the above embodiments.

DETAILED DESCRIPTION

Figure 1:
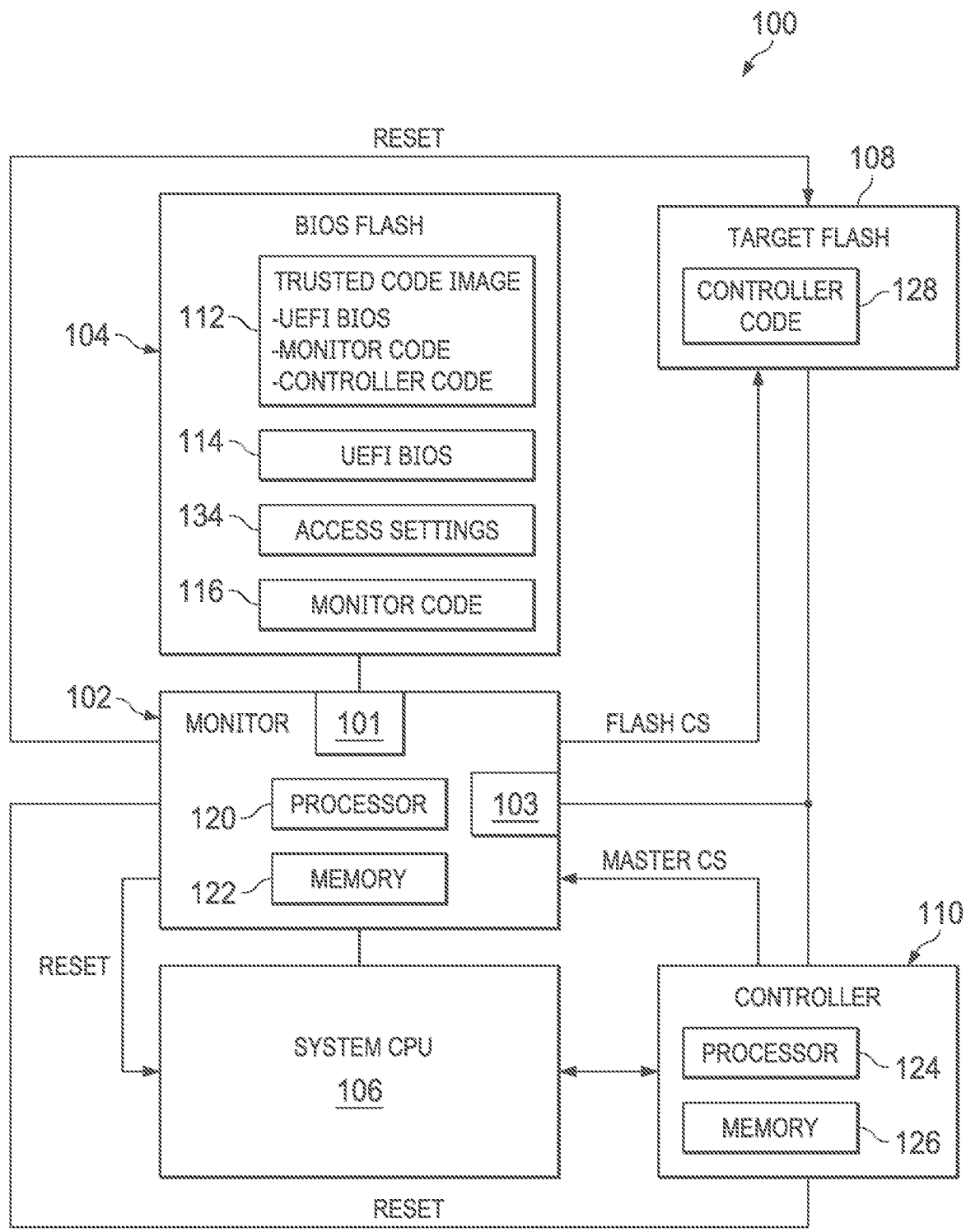
FIG. 1 is an illustration of a system for providing transparently attached flash memory security, according to embodiments of the present disclosure.

FIG. 1 is an illustration of a system 100 for providing transparently attached flash memory security, according to embodiments of the present disclosure. System 100 may include a monitor 102 configured to be transparently attached or communicatively coupled to a memory under protection. Monitor 102 may be implemented as a semiconductor device, field-programmable gate array, application-specific integrated circuit, module, or other circuit, including implementation by analog circuitry, digital circuitry, combinatorial logic, circuitry manifested by instructions or a hardware description language, instructions for execution by a processor, or any combination thereof to perform security for the memory under protection. Monitor 102 may include processing hardware within itself or may rely upon other processing hardware elsewhere in system 100. In one embodiment, monitor 102 may include a processor 120 and a memory 122. Instructions for execution may be loaded into memory 122 for execution by processor 120 that, when executed, cause monitor 102 to perform the operations and configurations of monitor 102 as described in the present disclosure. Monitor 102 may include interfaces 101, 103 to memory. Communication to or from memory by monitor 102 may be performed through interfaces 101, 103. Interfaces 101, 103 may be implemented by circuits with analog circuitry, digital circuitry, firmware, or any suitable combination thereof.

Monitor 102 may be configured to provide memory security for any suitable memory to be protected. Such memory may include any memory in which data is accessed in blocks, or in which data is accessed through chip enable, chip select, or other select or enable signals. Such memory may include, for example, flash memory, USB memory, parallel memory, or serial peripheral interface ("SPI") memory devices. The memory to be protected may be an attached memory, wherein the memory is attached as an external peripheral to another computing or electronic device, such as the other elements of system 100. For example, monitor 102 may be configured to provide memory security for a target flash memory 108. System 100 may include any suitable combination, quantity, and types of memory that may be protected by monitor 102. In particular, system 100 may include multiple flash memories and may communicatively couple these using the industry standard SPI bus to the rest of system 100. In one embodiment, a single instance of monitor 102 may protect access to multiple instances of target flash memory 108. In another embodiment, system 100 may include an instance of monitor 102 to protect each instance of target flash memory 108.

System 100 may implement, fully or in part, any suitable computing or electronic device, such as a computer, tablet, laptop, server, server application, smartphone, appliance, microcontroller, or consumer electronics device. System 100 may include a processor such as a system central processing unit ("CPU") 106. System CPU 106 may be implemented by any suitable processor with any suitable number and kind of processing cores. The elements of system 100 may be communicatively coupled together through any suitable busses or protocols, such as SPI, enhanced SPI ("eSPI"), slave attached flash sharing ("SAFS"), I2C, Advanced Microcontroller Bus Architecture ("AMBA"), or general purpose input and output ("GPIO").

System 100 may include any suitable number and kind of elements that may access memory, such as target flash memory 108. Such elements may include system CPU 106, other elements that may independently access target flash memory 108, or elements configured to offload management of some parts of system 100 from system CPU 106. An element configured to access target flash memory 108 be represented by controller 110. Controller 110 may be implemented by a processor 124, a memory 126, an integrated circuit device, analog circuitry, digital circuitry, or any suitable combination thereof. Controller 110 may implement, for example, a baseboard management controller ("BMC"). Controller 110 may perform attempted access of target flash memory 108 on behalf of, for example, itself, system CPU 106, or other elements (not shown).

Attempted accesses, such as writes or reads, of target flash memory 108 may be made by any entity, whether shown or not in FIG. 1. Unauthorized attempted accesses of target flash memory 108 may be made, for example, by software running on system CPU 106, by controller 110, or by other elements making requests of controller 110. Regardless of the source of the attempted access, monitor 102 may be configured to monitor attempted access of target flash memory 108. For example, upon booting and periodically, controller 110 may attempt to access controller code 128 in target flash 108 to load into memory 126 and then execute controller code 128 with processor 124. Controller code 128 may include, for example, compiled object code or other instructions or software for controller 110 to execute. Boot code for controller 110 may be stored in memory 126, and such boot code, when executed by processor 124, may cause controller 110 to attempt to access controller code 128 in target flash 108. Controller 110 may be configured to attempt to read controller code 128 in target flash 108 to copy instructions for execution into memory 126 to be executed by processor 124.

In one embodiment, monitor 102 may provide protection of target flash memory 108 in a transparent manner. The security provided by monitor 102, or even monitor 102 itself, may be transparent in that monitor 102 or its operations are not observed to other parts of system 100 or to third parties. Other parts of system 100 or third parties might not perceive the security mechanisms and measures implemented for target flash memory 108 by monitor 102.

In one embodiment, controller 110 may attempt to access target flash memory 108 using an SPI bus. When an SPI bus is used, a chip select ("CS") signal may be used to identify a particular memory device that is to be accessed for the attempted read or write. The CS signal may also be known as a chip enable signal. Various other busses may use a CS signal, chip enable signal, or an equivalent to identify to a group of memory devices which such memory device is to be used for the attempted access. When a given flash memory device from such a group of flash memory devices is to be used, an active CS signal may be routed to the given flash memory device while the CS signals to the other flash memory devices may be held inactive. The CS signal may be active high or active low. In the examples of the present disclosure, the CS signal may be active low. The CS signal may be routed to the appropriate flash memory device through any suitable switch or fabric (not shown).

Figure 2:
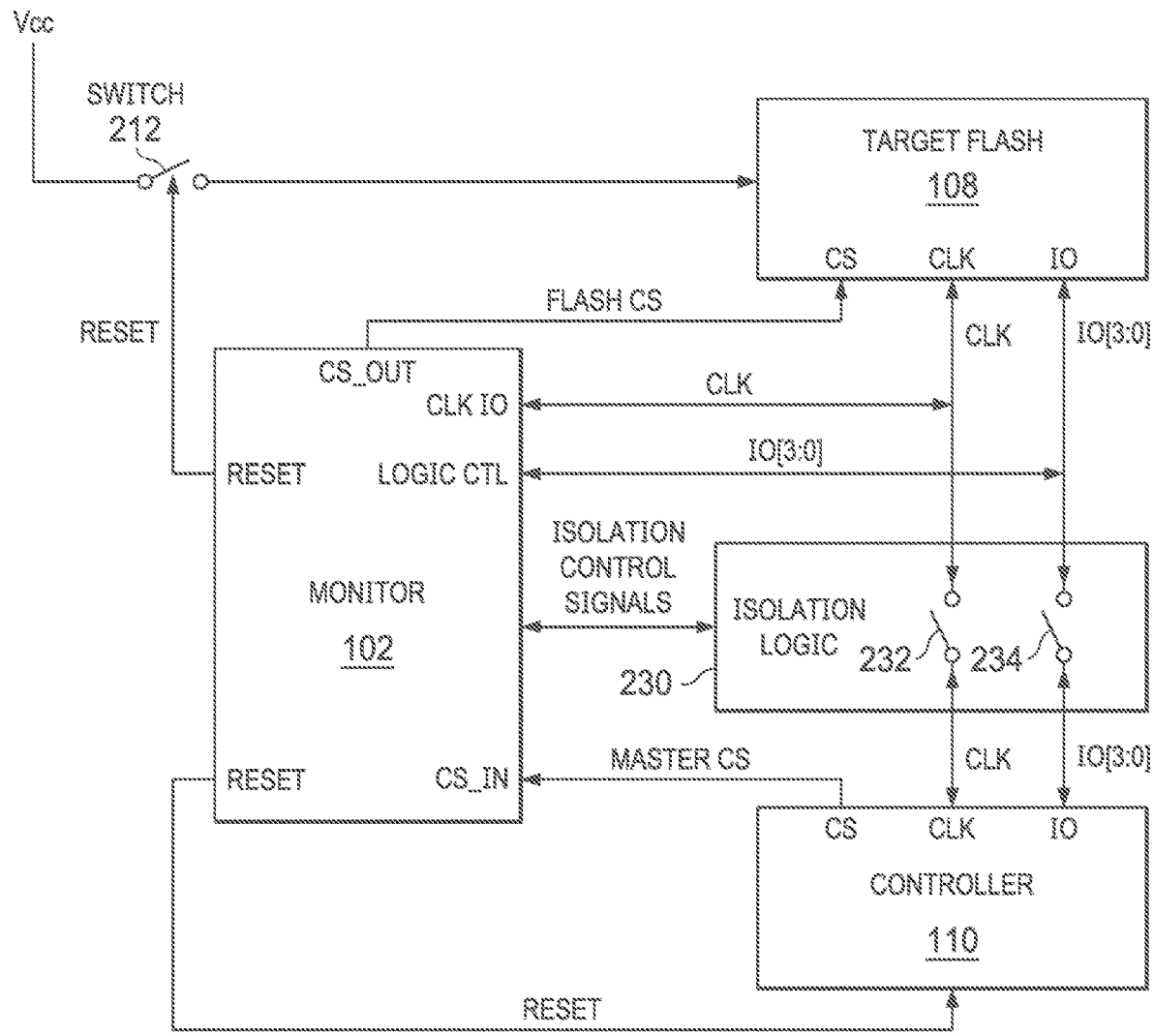
FIG. 2 is a more detailed illustration of portions of a system for providing transparently attached flash memory security, according to embodiments of the present disclosure.

In one embodiment, monitor 102 may be configured to intercept a CS signal to be sent to target flash memory 108. Monitor 102 may be configured to intercept such a CS signal (denoted master CS in FIG. 1) in any suitable manner. In one embodiment, monitor 102 may be implemented in an interface between controller 110 or other elements accessing target flash memory 108 and target flash memory 108. In another embodiment, a CS signal issued by controller 110 may be daisy-chained to monitor 102 before being forwarded to target flash memory 108. Controller 110 may issue the CS signal while not perceiving that the CS signal is routed through monitor 102. Monitor 102 may be configured to modify the CS signal if necessary and route the resulting modified signal (denoted flash CS in FIG. 1). Controller 110 may issue the CS signal to target flash memory 108 without perceiving or receiving any other indication that the CS signal will be first routed through monitor 102. Other signals, as shown in FIG. 2, may be routed directly from controller 110 to target flash memory 108. Such other signals may be copied to monitor 102. Through modification of the CS signal as-sent to target flash memory 108, by issuing a reset or kill signal to system CPU 106 or controller 110, by modifying a clock sent from controller 110 to target flash memory 108, or other techniques, monitor 102 may be configured to protect target flash memory 108 from unauthorized access.

Monitor 102 may be communicatively coupled to another flash memory device or other type of memory device. Such a memory device may be represented as a basic input/output system ("BIOS") flash 104. Memory 104 may include any suitable number and kind of data. Furthermore, contents of memory 104 may be replicated in other memories, such as target flash 108. Memory 104 may include, for example, a monitor code 116. Monitor code 116 may include instructions, executables, scripts, object code, or other information that causes monitor 102 to operate. Memory 104 may include a Unified Extensible Firmware Interface ("UEFI") BIOS 114 to operate memory 104. Furthermore, memory 104 may include a trusted code image 112, also known as a golden image. Trusted code image 112 may include known, safe, or trusted copies of information that may be accessed elsewhere within system 100. For example, trusted code image 112 may include a copy of UEFI BIOS 114, a copy of monitor code 116, and a copy of controller code 128. Monitor 102 may be configured to use contents within trusted code image 112 to check against other instances of such contents within system 100, to check against read copies of such other instances of such contents within system 100, and to restore instances of such contents within system 100 if it is determined that content has become compromised.

Monitor 102 may be configured to evaluate attempted access of target flash memory 108. The attempted accesses may be monitored on the basis of target address, attempted command, address from where the attempt originated, or any other suitable basis.

For example, certain commands to flash memory might be considered forbidden unconditionally in a certain state of target flash memory 108. A chip erase operation, for example, might be unauthorized when target flash memory 108 is designated as having crucial information. In another example, only read operations might be authorized if target flash memory 108 is designated as read-only. Write and erase commands may be suppressed. Monitor 102 may be configured to monitor specific sensitive addresses within target flash memory 108 across the entire address space of target flash memory 108. Certain commands may be forbidden within a given regions of target flash memory 108. The regions may be defined according to expected targets of malware, critical data, or across the entire memory device.

Monitor 102 may be configured to take corrective action if an attempted access of target flash memory 108 is unauthorized. The corrective action taken by monitor 102 may be manifested in manipulating the response of target flash memory 108 or other elements of system 100 to the attempted access, as discussed in further detail below. The corrective action taken by monitor 102 may be made upon the attempted execution of a command on target flash memory 108. Other security solutions include taking corrective action at the end of a memory access, such as in the target flash memory 108 itself or in a master device that communicates with the target flash memory 108. For many such master devices, it is not feasible to expect that the master devices will be redesigned in a consistent, standardized, or uniform manner for a security solution. There are many creators and sources of such devices that might access flash memory. Furthermore, neither flash nor master devices have sufficient hardware-based or real-time safeguards, especially for protection of addresses or regions over the entire flash space.

In one embodiment, the corrective action taken by monitor 102 may include a modification of the CS signal received from controller 110, which is then passed to target flash memory 108. The modification of the CS signal may cause an error condition. In another embodiment, the corrective action taken by monitor 102 may include a reset or kill signal issued to one or more of target flash memory 108, system CPU 106, and controller 110. The reset signal may cause the recipient to reset, soft reboot, or perform a power-down and power-up cycle. In yet another embodiment, the corrective action may include manipulation of a bidirectional SPI clock between target flash memory 108 and controller 110. The manipulation of the bidirectional SPI clock may cause a cancellation of a command to be executed. The corrective action may not affect accesses that are not malicious and may require no changes to the implementation of controller 110 or target flash memory 108.

FIG. 2 is a more detailed illustration of portions of system 100, according to embodiments of the present disclosure.

Controller 110 may be communicatively coupled to target flash memory 108 through any suitable number of busses. For example, controller 110 may be configured to issue a CS signal to target flash memory 108. However, as discussed above, this CS signal may be routed through monitor 102 before being forwarded and possibly modified to target flash memory 108. Target flash memory 108 and controller 110 may each perceive that they are receiving and sending the same CS signal, "CS". However, the CS signal may be routed as "master CS" instead to monitor 102 through interface 103 (not shown). Monitor 102 may forward the master CS signal as received, the master CS signal as modified, or the master CS signal as delayed to target flash memory 108 through interface 101 (not shown). The CS signal sent to target flash 108 may be denoted as "flash CS". Target flash memory 108 may be configured to process a command when its CS input goes low and end the command when its CS input goes high. In other implementations, target flash memory 108 may initiate the command when its CS input goes high and end the command when its CS input goes low.

Target flash memory 108 may be configured to receive a clock signal ("clk") from controller 110 through interface 103 (not shown). The clock signal may be configured to sequence the transfer of information, including commands and data, between target flash memory 108 and controller 110. Target flash memory 108 and controller 110 may be directly connected by a clock signal bus. In one embodiment, monitor 102 may be also connected to the clock signal bus. Monitor 102 may thus be configured to receive clock signals from controller 110 sent on the clock signal bus and to also issue clock signals on the clock signal bus between target flash memory 108 and controller 110.

Target flash memory 108 may be configured to receive and send data on a data bus ("IO[3:0]") between target flash memory 108 and controller 110. Thus, in a given clock cycle, four bits of information may be transferred between target flash memory 108 and controller 110. A command for target flash memory 108 may be specified on the data bus from controller 110 to target flash memory 108. Data to be written to target flash memory 108 may be specified on the data bus from controller 110 to target flash memory 108. Data to be read from target flash memory 108 may be specified on the data bus from target flash memory 108 to controller 110. In one embodiment, monitor 102 may also be connected to the data bus through interface 103 (not shown) to view what information is shared between controller 110 and target flash memory 108.

In one embodiment, target flash 108 and controller 108 may be selectively isolated from one another during particular modes of operation. For example, when monitor 102 is to issue a clock signal on the clock bus, or when monitor 102 is to issue data on the data bus, these signals may be intended to be received at target flash 108 but not controller 110. Furthermore, controller 110 might not be configured to float its pins used to interface target flash 108 while controller 110 is held in reset or when target flash 108 is held in reset. System 100 may include any suitable element to isolate pins of controller 110 during reset or while monitor 102 is writing data on a bus shared with controller 110. For example, system 100 may include isolation logic 230. Isolation logic 230 may be configured to isolate pins of controller 110 during reset or when monitor 102 is writing data to, for example, the clock bus or the data bus. Isolation logic 230 may be implemented by digital circuitry, analog circuitry, or any suitable combination thereof. For example, isolation logic 230 may include a switch 232 on the clock bus and a switch 234 of the data bus. Operation of switches 232, 234 may be controlled by, for example, isolation control signals issued by monitor 102. Switch 232 may be placed on the clock bus between a clock pin of controller 110 and a junction of bus lines to a clock pin of monitor 102 and a clock pin of target flash 108. Switch 234 may be placed on the data bus between data pins of controller 110 and a junction of bus lines to data pins of monitor 102 and data pins of target flash 108. Isolation control signals issued by monitor 102 may close switches 232, 234 when controller 110 is to write data to or receive data from target flash 108. In such a case, controller 110 might not be isolated from target flash 108. Isolation control signals issued by monitor 102 may open switches 232, 234 when controller 110 is reset or when monitor 102 is to write data to target flash 108. In such a case, controller 110 may be isolated from target flash 108.

In some embodiments, target flash memory 108 might not include a reset pin. Target flash memory 108 may have a power input for Vcc to power the operations of target flash memory 108. System 100 may include a switch 212 connected between Vcc and target flash memory 108. Switch 212 may be implemented in any suitable manner, such as by a transistor. Monitor 202 may be configured to control switch 212 through the reset signal. The reset signal might not be persistent but sufficient to open switch 212 and subsequently close switch 212 so as to power-cycle target flash memory 108. The length of the reset signal may be of any suitable length to cause switch 212 to power-cycle target flash memory 108. Switch 212 controlling Vcc delivery to target flash memory 108 may thus implement a reset mechanism for target flash memory 108, although any other suitable implementation may be used.

In one embodiment, monitor 102 may be configured to perform corrective action by terminating a command issued by controller 110. The command may be terminated before target flash memory 108 has finished completing the command. In a further embodiment, the command may be terminated by resetting controller 110. In another, further embodiment, the command may be terminated by resetting target flash memory 108. In various embodiments, one of target flash memory 108, controller 110 may be reset. In various other embodiments, both of target flash memory 108 and controller 110 may be reset. The reset signal may be of any suitable duration to cause controller 110 to reset itself through power cycling, hard reboot, soft reboot, or other reset operations specific to controller 110. Furthermore, the reset signal may be of any suitable duration to cause switch 212 to disconnect and reconnect Vcc to target flash memory 108 to cause a power cycle.

In one embodiment, monitor 102 may be configured to perform corrective action by corrupting execution of a command issued by controller 110 in a manner that will cause target flash memory 108 to discard the command. In a further embodiment, monitor 102 may be configured to corrupt execution of a command issued by controller 110 by inserting an unexpected quantity of clock pulses on the clock bus. In another, further embodiment, monitor 102 may be configured to corrupt execution of a command issued by controller 110 by completing a CS signal when controller 110 has issued a quantity of clock pulses on the clock bus, upon which target flash memory 104 would not expect a completed CS signal. The unexpected quantity of clock pulses may exceed an expected quantity of clock pulses at target flash memory 108 for a given phase of communication. The unexpected quantity of clock pulses may include, for example, an odd number of clock signals, but any suitable additional clock signals may be used. In another, further embodiment, monitor 102 may be configured to corrupt execution of a command issued by controller 110 by delaying an instance of the CS signal received from controller 110 that controller 110 would send upon completion of the command. This may extend operation of the command. In yet another, further embodiment, monitor 102 may be configured to corrupt execution of a command issued by controller 110 by completing an instance of the CS signal received from controller 110 earlier than when controller 110 actually completes the CS signal. This may, for example, cut off a read or write command.

Figure 3:
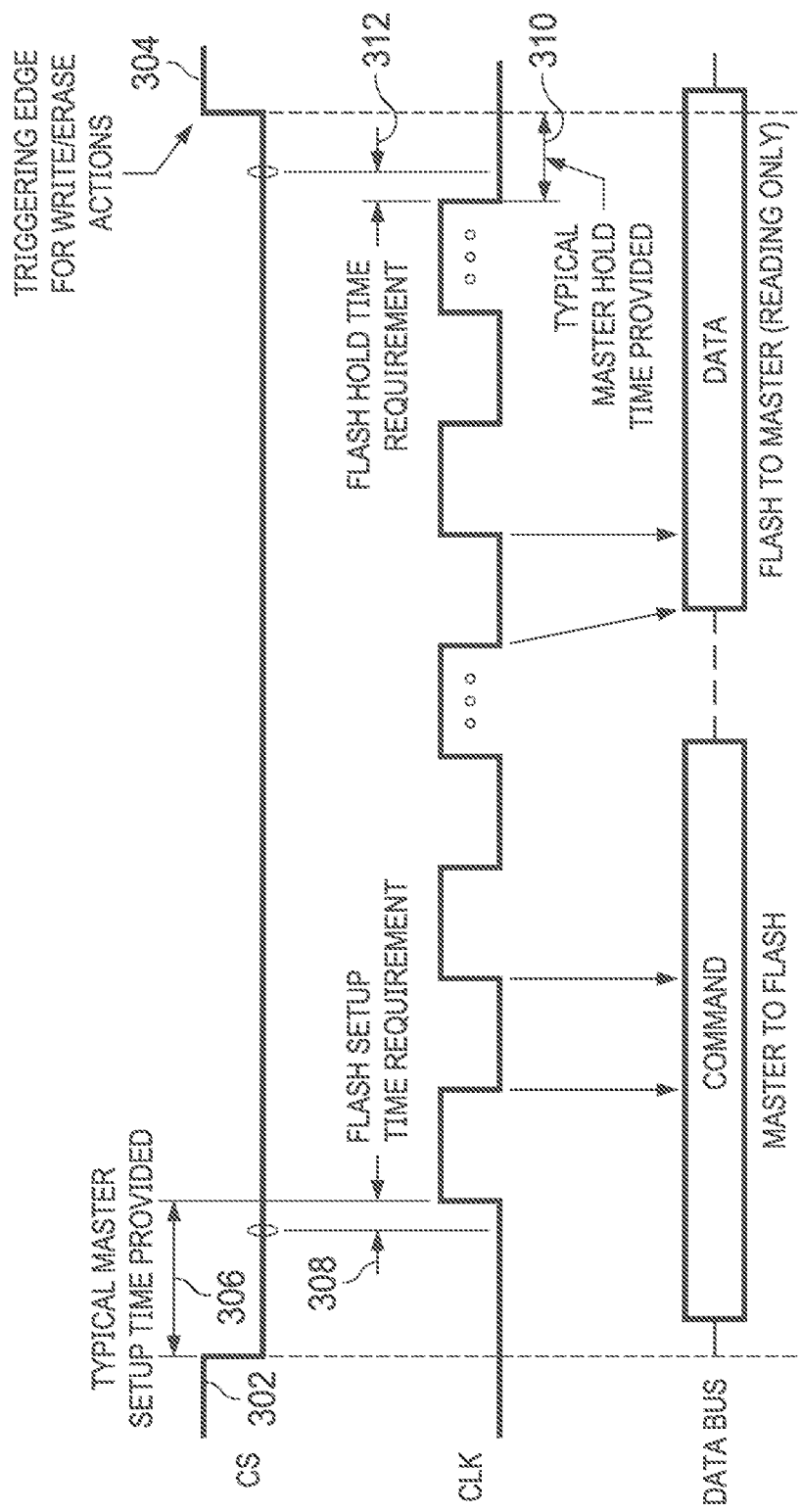
FIG. 3 is an illustration of timing of an example command from a controller to memory, according to embodiments of the present disclosure.

FIG. 3 is an illustration of timing of an example command from controller 110 to target flash memory 108, according to embodiments of the present disclosure. FIG. 3 illustrates operation of system 100 wherein monitor 102 does not take corrective action. Illustrated in FIG. 3 are timing diagrams of the CS signal, clock signal, and data bus from controller 110 to target flash memory 108. Controller 110 may be referenced as a master or master device, and signals from controller 110 may be referenced as master signals.

At 302, the CS signal may become active-low, signaling that target flash memory 108 will perform an operation. The CS signal may be active-low until the completion of the command at 304. At 304, upon a rising edge of the CS signal becoming inactive-high, the action may be completed by target flash memory 108. Such an action may be the completion of write or erase. While the CS signal is active-low, the identity of the command may be communicated over the data bus. The first bits of the command may be issued by controller 110 before controller 110 issues the first clock pulse. Furthermore, the data bus may communicate data read from target flash memory 108 to controller 110 in reading operations. Data to be written may be communicated via other mechanisms. In addition, clock signal pulses may issue from controller 110 to target flash memory 108. Information may be read or written between target flash memory 108 and controller 110 upon each such clock pulse.

306 illustrates a length of time typically required for controller 110 to perform setup for execution of the command after the CS signal becomes active-low and before the first clock pulse. 308 illustrates a length of time required for target flash memory 108 to perform setup for execution of the command after the CS signal becomes active-low and before the first clock pulse. 310 illustrates a length of time typically required for hold time for controller 110 after the last clock pulse and before the CS signal becomes inactive-high. 312 illustrates a length of time typically required for hold time for target flash memory 108 after the last clock pulse and before the CS signal becomes inactive-high. As shown in FIG. 3, setup and hold requirements may be shorter in time for target flash memory 108 as compared to controller 110. In one embodiment, monitor 102 may be configured to make its determinations of whether to apply corrective action, and to take such corrective actions, during the setup and hold times of controller 110 before the first clock pulse and after the last clock pulse issued from controller 110 to target flash memory 108.

Target flash memory 108 might not include a status signal output that is constantly generated and provided to controller 110. When controller 110 issues a command that takes a large amount of time (such as write or erase), controller 110 may issue polling commands to target flash memory 108. Such a command may include "READ STATUS". This command may examine a bit called "BUSY" in bit position 0 of the response generated by target flash memory 108. The response may be generated by target flash memory 108 in response to the original read or write command. The write command may be typically called "PROGRAM" in flash reference datasheets, but the present disclosure may use the term "write".

Figure 4:
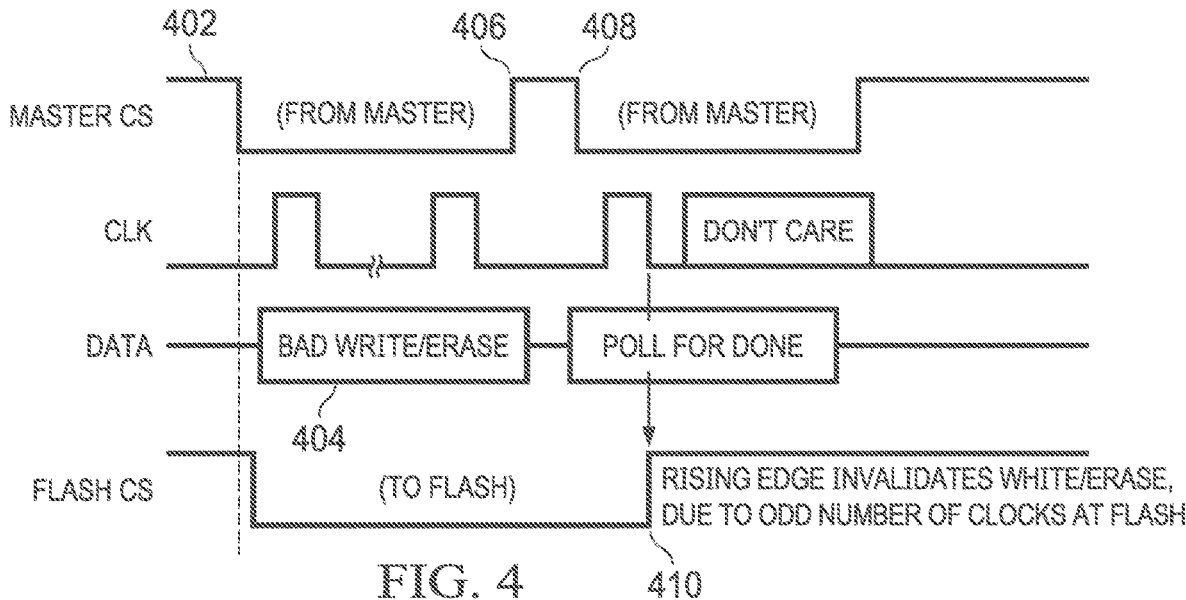
FIG. 4 is an illustration of operation of a system to inhibit issuance of a complete chip select signal to take corrective action for unauthorized access of target flash memory 108, according to embodiments of the present disclosure.

FIG. 4 is an illustration of operation of system 100 to inhibit issuance of a complete CS signal to take corrective action for unauthorized access of target flash memory 108, according to embodiments of the present disclosure. Monitor 102 may be configured to take corrective action by issuing a CS signal, wherein completion of the CS signal is delayed as compared the master CS signal generated by controller 110. Monitor 102 may be configured to inhibit or delay the CS signal received by target flash memory 108 from returning to inactive-high at the completion of a command as compared with the master CS signal generated by controller 110. This may be referred to as a "stretch" technique as it stretches or extends the period of time that the CS signal is active-low beyond the normal operation of controller 110. A stretch technique may be used to take corrective action on unauthorized write, erase, or chip erase commands. The stretch technique may take advantage of the configuration of target flash memory 108 to act upon the rising edge of a CS signal. By stretching the period in which the CS signal is active-low, monitor 102 may be allowed to take other measures to cancel the action.

Illustrated in FIG. 4 is the master CS signal generated by controller 110 and provided to monitor 102. Also illustrated are clock and data signals sent from controller 110 to target flash memory 108, which are also observed by monitor 102. In addition, FIG. 4 illustrates the flash CS signal, which is the master CS signal as-modified (if monitor 102 modifies the signal) and provided to target flash memory 108.

At 402, the master CS signal may transition to active-low, and the active-low CS signal may be forwarded after a slight delay from monitor 102 to target flash memory 108 via flash CS. Monitor 102 may determine that the command to be performed is an unauthorized or a bad write or erase command at 404, and thus may take corrective action. At 406, the master CS signal may return to inactive-high. However, monitor 102 may suppress the master CS signal from being output as flash CS. Instead, monitor 102 may continue to hold the flash CS signal as active-low.

At 408, controller 110 may set the master CS signal as active-low and issue a poll command to see if target flash memory 108 is done with the previous command. However, the previous command has been effectively suppressed by monitor 102 by extending the time in which flash CS signal is active-low. Monitor 102 may cause target flash memory 108 to generate an invalid response. For example, target flash memory 108 may expect an even number of clock cycles before receiving an inactive-high CS signal to complete the command. An unexpected quantity of clock cycles may cause an error condition or otherwise generate an invalid response without performing the write or erase. For example, monitor 102 may issue an inactive-high rising edge for the flash CS upon an odd-numbered clock cycle at 410. The odd-numbered clock signal may arise, for example, in conjunction with controller 110 issuing the odd-numbered clock signal for polling. The odd-numbered clock signal may be inserted by monitor 102. Subsequently, target flash memory 108 may see the odd number of clock cycles in combination with a rising edge on its CS signal input and generate an invalid or error response to controller 110. Target flash memory 108 may generate an invalid or error response to any other quantity of unexpected clock signals. Controller 110 may thus only see an error or invalid condition in response to its unauthorized attempted access of target flash memory 108. Accordingly, the unauthorized attempt by controller 110 may be blocked by monitor 102. The command of the unauthorized attempt may be effectively cancelled upon a polling operation by controller 110.

This stretch technique may be used in situations wherein controller 110 is configured to issue an erase or write command that normally requires follow-up polling commands before issuing further commands to target flash memory 108. This technique might not require resetting target flash memory 108 or controller 110. As a result of the stretch technique, the poll result may fail entirely, may be corrupted, or may be erroneous. Instead of an appropriate response to the polling command, controller 110 may perceive a "BUSY" status of target flash memory 108 instead of a response from target flash memory 108 to the polling command. This may cause controller 110 to try polling again. Upon a second attempted polling, after the stretch technique has allowed the chip select signal to be completed, target flash memory 108 may be able to respond to the poll and might no longer appear to have a "BUSY" status of "1". At such a subsequent polling, target flash memory 108 may reply with an error or an indication that the command was completed, even though the command was not completed. Such an indication may include a null response or response that no further processing is being attempted, which may be interpreted by controller 110 as a completed command.

Figure 5:
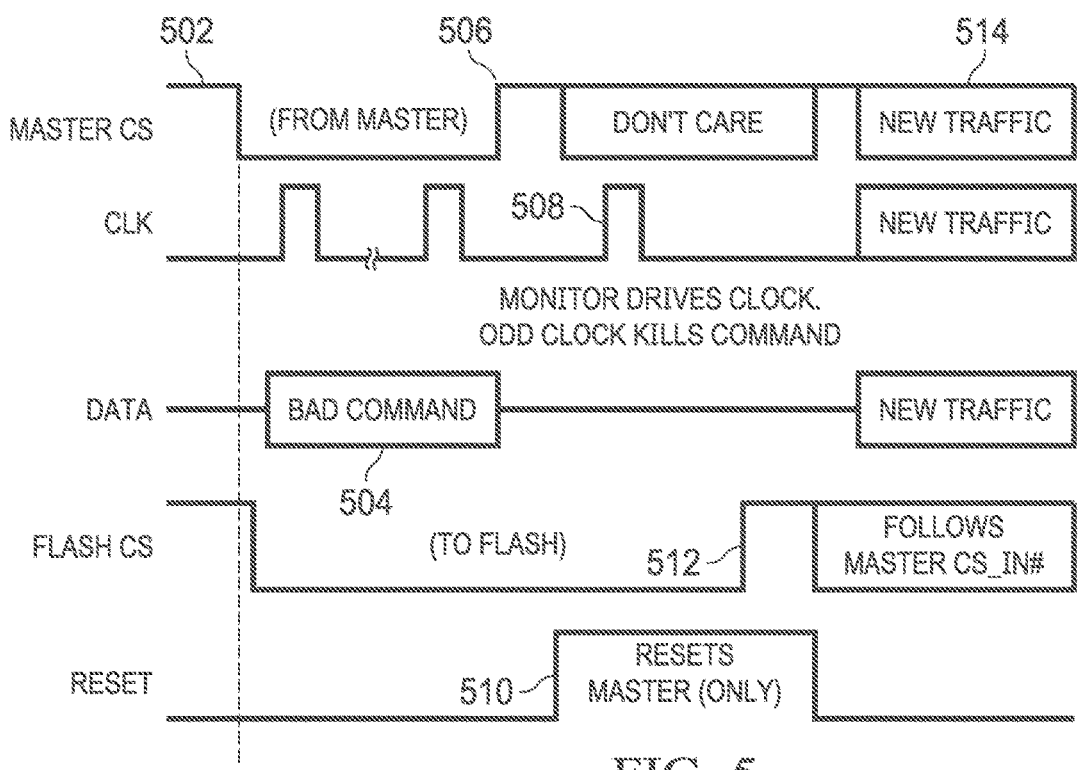
FIG. 5 is an illustration of further operation of a system to inhibit issuance of a complete chip select signal to take corrective action for unauthorized access of memory, according to embodiments of the present disclosure.

FIG. 5 is an illustration of further operation of system 100 to inhibit issuance of a complete CS signal to take corrective action for unauthorized access of target flash memory 108, according to embodiments of the present disclosure. FIG. 5 illustrates additional stretch techniques that may be performed by monitor 102. In FIG. 5, monitor 102 may take corrective action by again using the requirement that target flash memory 108 receive an even number of clock pulses before receiving a rising edge of the CS signal. In FIG. 4, monitor 102 used such a requirement by waiting for an unexpected quantity of clock cycles, such as an odd number of clock cycles, to be sent by controller 110 to target flash memory 108. In contrast, in FIG. 5, monitor 102 may generate an extra clock cycle and send it to target flash memory 108.

Illustrated in FIG. 5 is the master CS signal generated by controller 110 and provided to monitor 102. Also illustrated are data signals sent from controller 110 to target flash memory 108, which are also observed by monitor 102. FIG. 5 also illustrates a clock signal sent from controller 110 to target flash memory 108, which is observed and alterable by monitor 102. In addition, FIG. 5 illustrates the flash CS signal, representing the master CS signal as-modified (if monitor 102 modifies the signal) and provided to target flash memory 108. Also illustrated in FIG. 5 is a reset or kill signal that may be issued from monitor 102 to controller 110.

At 502, the master CS signal may transition to active-low, and the active-low CS signal may be forwarded after a slight delay from monitor 102 to target flash memory 108 via flash CS. Monitor 102 may determine that the command to be performed is an unauthorized or a bad write or erase command at 504, and thus may take corrective action. At 506, the master CS signal may return to inactive-high. However, monitor 102 may suppress the master CS signal from being output as flash CS. Instead, monitor 102 may continue to hold the flash CS signal as active-low. After 506, the master CS signal may be ignored until 514.

At 508, an extra clock pulse may be inserted by monitor 102 into the clock bus so that the extra clock pulse arrives at target flash memory 108. Target flash memory 108 may be expecting a precise number of clock signals before receiving the rising edge of the CS signal transitioning to inactive-high. If more or less than the correct number of clock signals arrive before the rising edge of the CS signal transitions to inactive-high, target flash memory 108 may generate an error or discard the command.

At 510, monitor 102 may send a reset signal to controller 110. At 512, monitor 102 may transition flash CS to inactive-high. Target flash memory 108, upon receiving the rising edge of the inactive-high CS signal and upon having received an incorrect number of clock cycles prior to the rising edge of the CS signal, may enter an error or invalid condition. The condition might not require resetting of target flash memory 108. Controller 110 may thus only see an error or invalid condition in response to its unauthorized attempted access of target flash memory 108. Accordingly, the unauthorized attempt by controller 110 may be blocked by monitor 102. The command of the unauthorized attempt may be effectively cancelled. At 514, normal operation may resume with additional traffic.

The stretch technique of FIG. 5 utilizes a requirement of some flash devices that an erase or write command must have a precise number of clock pulses. If an incorrect number of clock pulses is received, the command might not be executed by target flash memory 108. For example, a chip erase command might be required to be exactly one byte in length. If an additional clock pulse is inserted into the clock bus, target flash memory 108 may read an additional data bit based upon the clock extra pulse. A block or sector erase command might be required to have exactly one command byte and a correct number of address bytes. If an additional clock pulse is inserted into the clock bus, target flash memory 108 may read an additional data bit in the command or address based upon the clock extra pulse. A write command might be required to attempt to write an integral number of bytes and will be discarded if a partial byte is included at the end. Therefore, any command of these types can be cancelled by causing an unexpected quantity of clock pulses, such as a single extra clock, to be seen by target flash memory 108.

Furthermore, the stretch technique of FIG. 5 illustrates how a command can be cancelled by resetting the offending controller 110, but not power-cycling target flash memory 108. While controller 110 is reset, controller 110 may float (or pull only resistively) the clock line while it is reset, allowing monitor 102 to insert additional clock pulses into the clock bus. Thus, the reset signal may reset the master device before monitor 102 inserts a clock pulse and allows flash CS to transition to inactive-high. Such a configuration may provide assurances that the command in progress is discarded by target flash memory 108, without having to reset target flash memory 108

Figure 6:
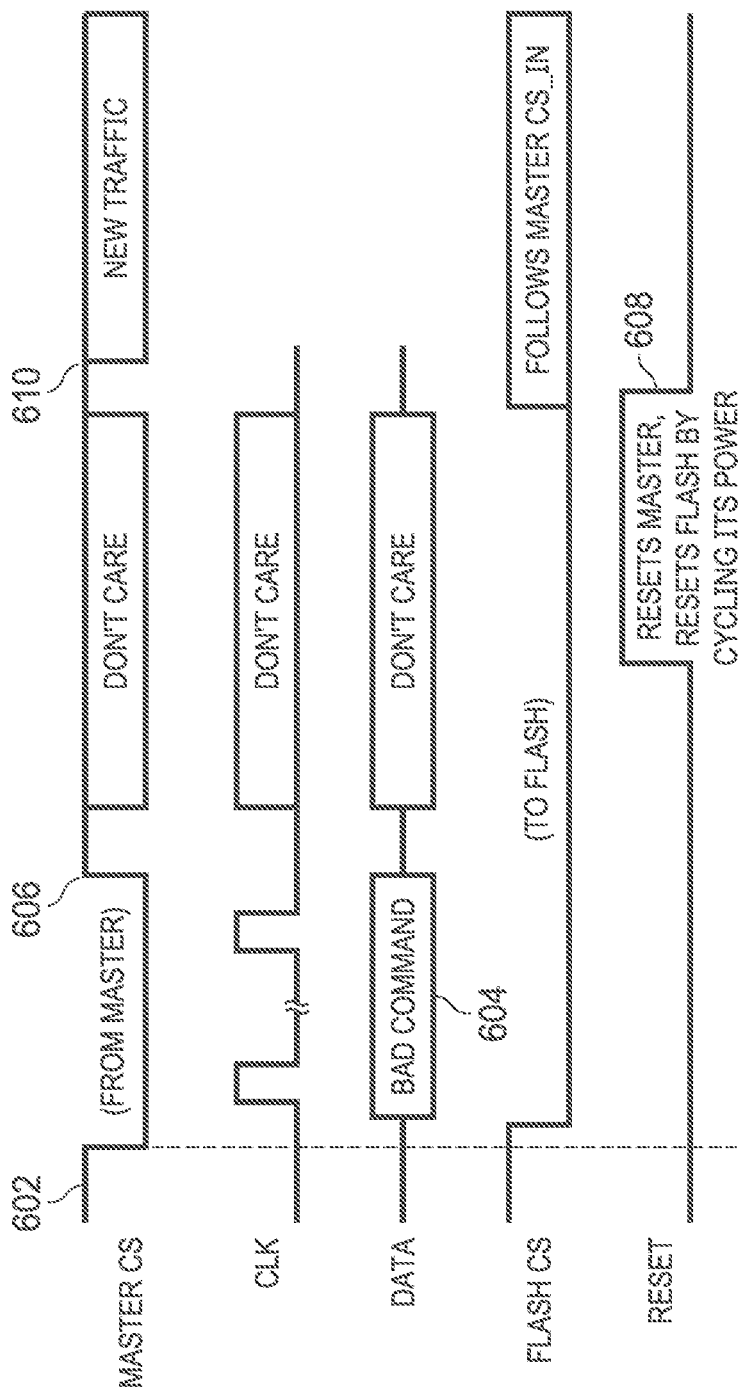
FIG. 6 is an illustration of yet further operation of a system to inhibit issuance of a complete chip select signal to take corrective action for unauthorized access of flash memory, according to embodiments of the present disclosure.

FIG. 6 is an illustration of yet further operation of system 100 to inhibit issuance of a complete CS signal to take corrective action for unauthorized access of flash memory, according to embodiments of the present disclosure. FIG. 6 illustrates yet additional stretch techniques that may be performed by monitor 102. In FIG. 6, monitor 102 may take corrective action by resetting target flash memory 108. Furthermore, monitor 102 may take corrective action by resetting controller 110.

Illustrated in FIG. 6 is the master CS signal generated by controller 110 and provided to monitor 102. Also illustrated are data and clock signals sent from controller 110 to target flash memory 108, which are also observed by monitor 102. In addition, FIG. 6 illustrates the flash CS signal, representing the master CS signal as-modified (if monitor 102 modifies the signal) and provided to target flash memory 108. Also illustrated in FIG. 6 is a reset signal that may be issued from monitor 102 to controller 110 and to switch 212.

At 602, the master CS signal may transition to active-low, and the active-low CS signal may be forwarded after a slight delay from monitor 102 to target flash memory 108 via flash CS. Monitor 102 may determine that the command to be performed in an unauthorized or a bad write or erase command at 604, and thus may take corrective action. At 606, the master CS signal may return to inactive-high. However, monitor 102 may suppress the master CS signal from being routed to flash CS. Instead, monitor 102 may continue to hold the flash CS signal as active-low. After 606, the master CS signal may be ignored until 610.

At 608, a reset signal may be issued by monitor 102 to switch 212 to cause a power cycle reset of target flash memory 108. Furthermore, a reset signal may be issued by monitor 102 to controller 110. Intermediate states of the clock, data and master CS may be ignored until after the resets clear at the end of 608. Controller 110 may thus only see a reset in response to its unauthorized attempted access of target flash memory 108. Accordingly, the unauthorized attempt by controller 110 may be blocked by monitor 102. The command of the unauthorized attempt may be effectively cancelled. New traffic, in the form of additional commands, may be issued by controller 110 at 610. When handling such new traffic, monitor 102 may propagate or follow the master CS signal from controller 110, until another bad or unauthorized command is detected.

The stretch technique of FIG. 6 may be used for a wide variety of situations in which corrective action is to be taken. However, the corrective action may be a relatively drastic measure as a reset of controller 110 may be performed. The stretch technique of FIG. 6 may be used, for example, for short commands that do not involve polling afterwards to ensure that the command was actually accomplished. These may include some mode setting commands.

Figure 7:
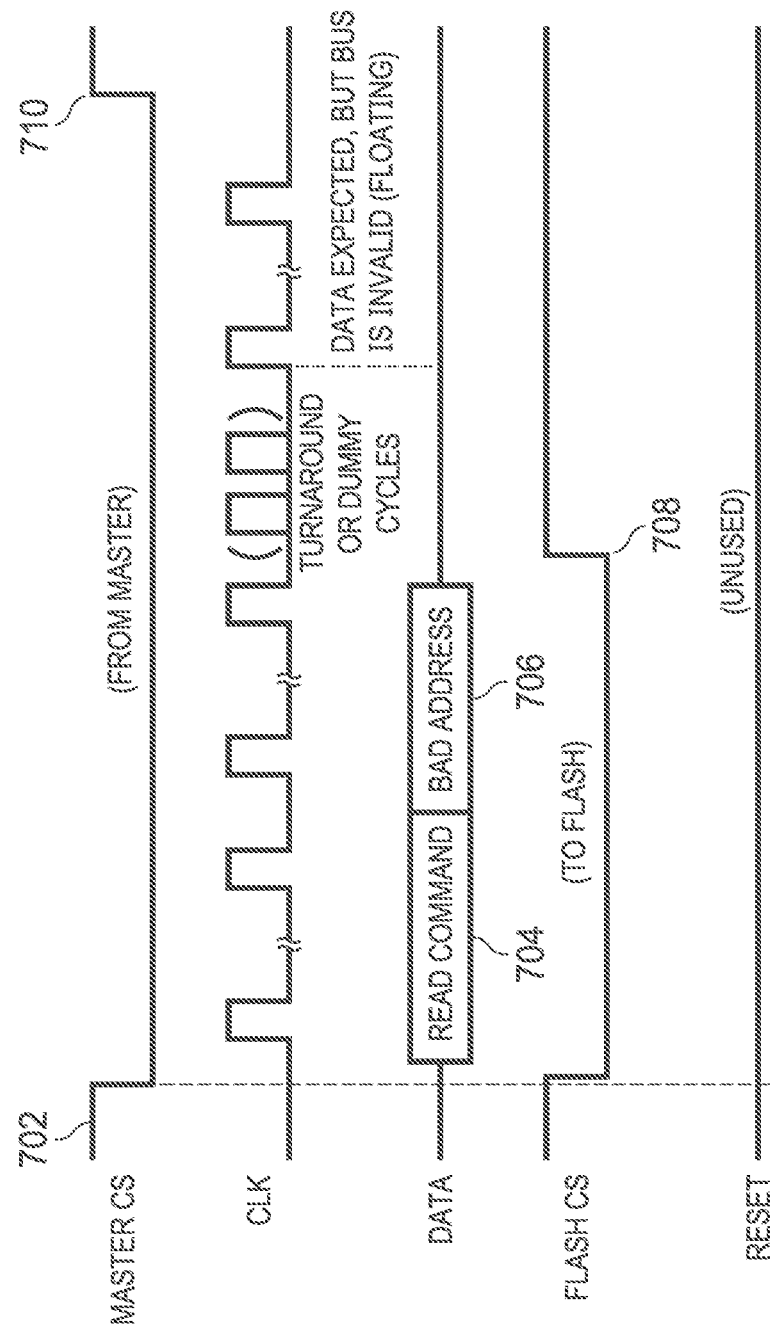
FIG. 7 is an illustration of operation of a system to accelerate completion of a chip select signal to take corrective action for unauthorized access of target flash memory, according to embodiments of the present disclosure.

FIG. 7 is an illustration of operation of system 100 to accelerate completion of a CS signal to take corrective action for unauthorized access of target flash memory 108, according to embodiments of the present disclosure. Monitor 102 may be configured to take corrective action by issuing a CS signal, wherein completion of the CS signal is accelerated as compared the CS signal generated by controller 102. Monitor 102 may be configured to end the valid CS signal to target flash memory 108 before controller 110 attempts to actually end the CS signal. The result may be that the CS signal received at target flash memory 108 returns to inactive-high before the completion of a command, causing the command to not complete. This may be referred to as a "shrink" technique as it shrinks or lessens the period of time that the CS signal is active-low to a period short than would normally be used by controller 110. A shrink technique may be used to take corrective action on unauthorized read commands. The shrink technique may take advantage of the configuration of target flash memory 108 to act upon the rising edge of a CS signal. By shrinking the period in which the CS signal is active-low, monitor 102 may interrupt the command and cancel the unauthorized action.

Illustrated in FIG. 7 is the master CS signal generated by controller 110 and provided to monitor 102. Also illustrated are clock and data signals sent from controller 110 to target flash memory 108, which are also observed by monitor 102. In addition, FIG. 7 illustrates the flash CS signal, representing the master CS signal as-modified (if monitor 102 modifies the signal) and provided to target flash memory 108. The reset signal might not be used in this technique.

At 702, the master CS signal may transition to active-low, and the active-low CS signal may be forwarded after a slight delay from monitor 102 to target flash memory 108 via master CS. At 704, a read command may be issued by controller 110. At 706, controller 110 may specify the address from which contents will be read. Monitor 102 may determine that the address is unauthorized or a bad address, as the address protected from being read by controller 110. Monitor 102 may thus determine that the command is an unauthorized read command. Monitor 102 may take corrective action in response.

At 708, monitor 102 may terminate operation of the command by issuing an inactive-high signal on master CS to target flash memory 108. Target flash memory 108, receiving the transition to inactive-high, may act as-if the command has terminated. Controller 110 or monitor 102 may issue "turnaround" or "dummy" clock cycles, discussed in further detail below. After such dummy clock cycles, controller 110 may expect a reply from target flash memory 108. However, the contents of the data bus may be invalid or floating responsive to the signal on master CS being inactive-high. Thus, the data received by controller 110 may be useless. At 710, controller 110 may issue a transition to inactive-high on CS_IN. This may be suppressed by monitor 102 and not forwarded to target flash memory 108.

This shrink technique may utilize a need for delay within execution of read commands. Such a delay may be needed both for an initial access time and for changing the direction of transmission on the bidirectional data bus. The cycles needed to change the direction of transmission on the bidirectional data bus may be referred to as "turnaround" cycles. This delay is provided either by a slower clock rate or by a certain number of artificial or "dummy" clock cycles at full speed.

Figure 8:
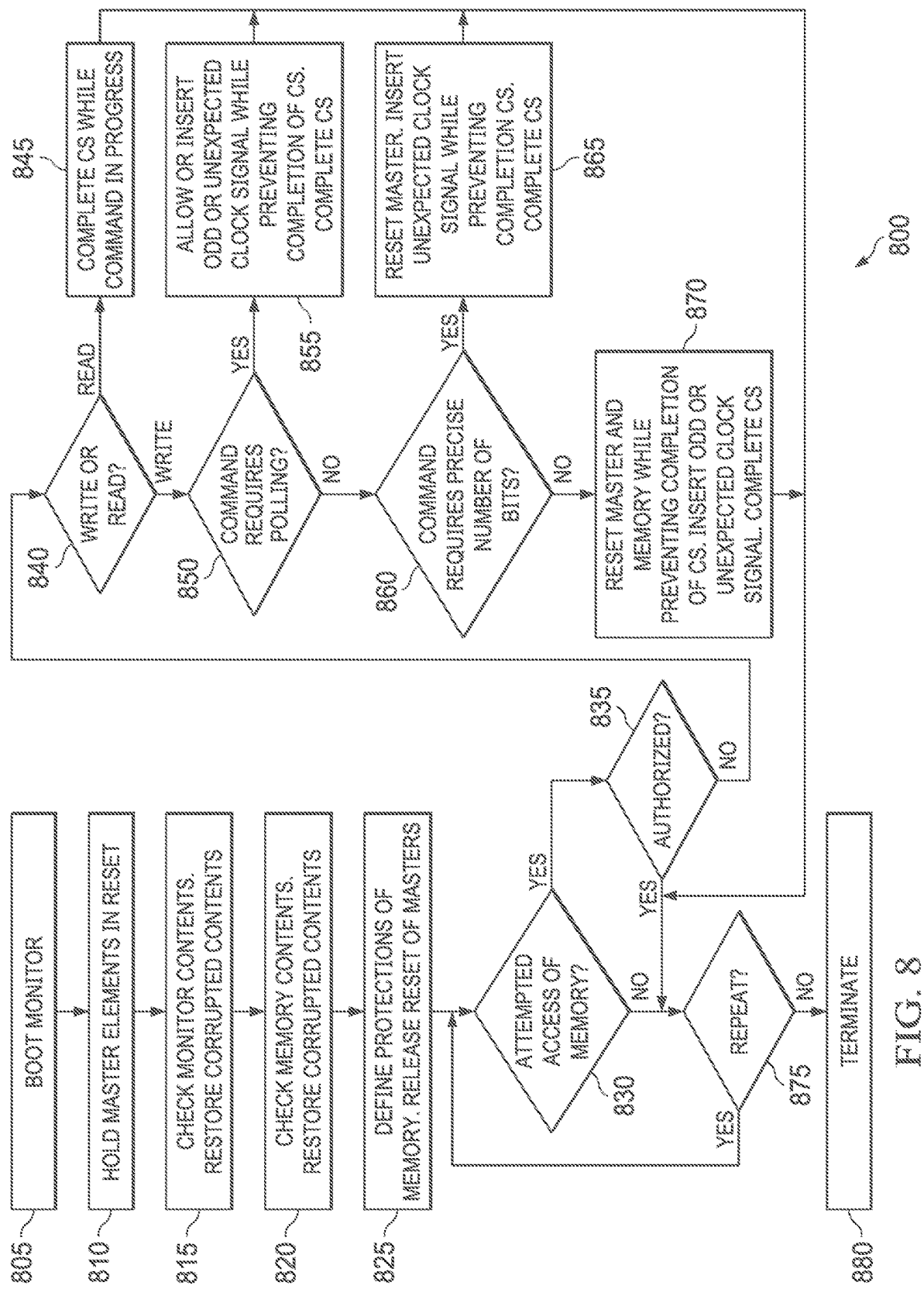
FIG. 8 is an illustration of an example method for performing transparently attached flash memory security, according to embodiments of the present disclosure.

FIG. 8 is an illustration of an example method 800 for performing transparently attached flash memory security, according to embodiments of the present disclosure. Method 800 may be performed by any suitable mechanism, such as monitor 102. The steps of method 800 may be performed in any suitable order, and may be initiated at any step, such as step 805. Various steps of method 800 may be repeated, omitted, or performed recursively. Multiple instances of method 800 may be performed in parallel or recursively. Method 800 may be embodied fully or in part analog circuitry, digital circuitry, combinatorial logic, circuitry manifested by instructions or a hardware description language, instructions for execution by a processor, or any combination thereof. The instructions may be on a non-transitory, machine-readable medium. The instructions, when loaded and executed by a processor, may cause the processor to perform the functionality of various parts of system 100 such as monitor 102.

At step 805, the monitor may be booted or initialized. At step 810, master elements that may access memory may be held in a reset by issuing and holding a reset signal to the master elements. At step 815, contents of the monitor may be checked for validity. If the contents are not valid, they may be restored from a trusted image in memory. At step 820, contents of memory to be accessed by the master elements may be checked for validity. If the contents are not valid, they may be restored from a trusted image in memory. At step 825, definitions of protections of memory may be loaded. The master elements may be released from reset.

At step 830, it may be determined whether an attempted access of memory has been made. If so, method 800 may proceed to step 835. Otherwise, method 800 may proceed to step 875.

At step 835, it may be determined whether the attempted access of memory was authorized. For example, all chip erase commands might not be allowed. A read or write to a given address may be allowed or forbidden based upon the address and the read or write. If the attempted access was authorized, the access may be allowed and method 800 may proceed to step 875. If the attempted access was not authorized, method 800 may proceed to step 840.

At step 840, suitable corrective action may be determined. The corrective action may be based upon the nature of the attempted access. If the attempted access was a read operation, method 800 may proceed to step 845. If the attempted access was a write operation, method 800 may proceed to step 850.

At step 845, a CS signal sent to the accessed memory may be completed while the command is still being executed. This may be a shrink operation and may cause the memory to provide invalid information. Method 800 may proceed to step 875.

At steps 850-870, a suitable write command cancellation may be determined. At step 850, it may be determined whether the write command requires follow-up polling. If so, method 800 may proceed to 855. Otherwise, method 800 may proceed to step 860.

At step 855, a CS signal may be sent to the accessed memory. Completion of the CS signal may be temporarily prevented to the accessed memory. An odd number of clock cycles, or an unexpected clock cycle may be allowed to be sent into a clock bus of the memory, or the odd or unexpected clock cycle may be inserted into a clock bus of the memory. Completion of the CS may be suppressed or delayed—as compared to a received CS signal—while the odd or unexpected clock cycle is visible to the memory. Afterwards, the CS signal issued to the memory may be completed. Method 800 may proceed to step 875.

At step 860, it may be determined whether the command requires a precise number of bits in, for example, the command, an operand, or a target address. If so, method 800 may proceed to step 865. Otherwise, method 800 may proceed to step 870.

At step 865, a CS signal may be sent to the accessed memory. The master may be reset. An extra or unexpected clock cycle may be inserted into the clock signal bus to the memory by the monitor while preventing or suppressing completion of the CS signal from the master. Afterwards, the CS signal issued to the memory may be completed. Method 800 may proceed to step 875.

At step 870, a CS signal may be sent to the accessed memory. The master and the memory may be reset while preventing or suppressing completion of the CS signal received from the master. The memory may be reset by causing the memory to enter a power down and power up cycle. An extra or unexpected clock cycle may be inserted into the clock signal bus to the memory by the monitor while preventing or suppressing completion of the CS signal from the master. Afterwards, the CS signal issued to the memory may be completed. Method 800 may proceed to step 875.

At step 875, it may be determined whether method 800 will repeat. The determination may be based on configuration settings, reset signals or input, or user input, or any other suitable criteria. If method 800 is to repeat, method 800 may repeat at, for example, step 830. Otherwise, at step 880, method 800 may terminate.

Returning to FIG. 1, monitor 102 may be configured to provide protection for target flash memory 108 in real-time as elements such as controller 110 attempt to access target flash memory 108. Furthermore, monitor 102 may itself be protected by various security measures. In addition, monitor 102 may be configured to utilize various resources to provide real-time protection for target flash memory 108.

In one embodiment, monitor code 116 may be stored in a memory 104. Upon startup of monitor 102, monitor code 116 may be loaded into memory of system 100 and executed. Upon booting, monitor 102 may load monitor code 116 from memory 104. Monitor 102 may be configured to check that monitor code 116 has been correctly signed before loading monitor code 116. If monitor code 116 has not been correctly signed, or otherwise fails authentication, monitor 102 may be configured to copy monitor code from trusted code image 112. The digital signature and authentication may be performed in any suitable manner, such as with encryption keys such as Rivest-Shamir-Adleman ("RSA") keys, by a shared-secret encryption technique, or public-private key pair. Furthermore, monitor 102 may be configured to validate other elements of system 100, such as UEFI BIOS 114 and controller code 128 as controller code 128 is read from target flash 108. The authentication may include checking digital signatures or comparing the substance of the elements to a known, true value stored in trusted code image 112. If monitor 102 determines that any such elements are not authentic, monitor 102 may be configured to copy the elements from trusted code image 112.

In one embodiment, during run-time monitor 102 may be configured to filter all attempts to access target flash memory 108. Monitor 102 may be configured to enforce protections for target flash memory 108 based upon addresses or regions of memory thereupon. A definition of what addresses or regions of memory are to be protected, as well as criteria for protecting such addresses or regions of memory may be defined by access settings 134. Access settings 134 may be stored in any suitable location, such as in memory 104 or within trusted code image 112. Access settings 134 may be encrypted.

As discussed above, monitor 102 may be configured to authenticate monitor code 116 upon booting before loading monitor code, and may be configured to check other contents. Monitor 102 may be configured to compare such elements with, for example, trusted code image 112. Monitor 102 may be configured to compare such contents by, for example, comparing content bit-by-bit or byte-by-byte, signatures, or checksums of each of element with those of trusted versions within trusted code image 112. The contents of target flash memory 108 that are to be checked by monitor 102 may be a particular subset or address range of the available contents or storage of target flash memory 108. The particular subset or address range may be defined in access settings 134. If the contents of target flash memory 108 have been corrupted and do not match the expected contents, monitor 102 may be configured to restore such contents with trusted code image 112. Monitor 102 may be configured to perform such a check for other flash memories, such as portions of memory 104 or other instances of target flash 108. For example, monitor 102 may be configured to check the authenticity of UEFI BIOS 114 and, if UEFI BIOS 114 has been corrupted, restore UEFI BIOS 114 from trusted code image 112.

In one embodiment, during boot of monitor 102, monitor 102 may be configured to hold system CPU 106 and controller 110 in a reset mode by issuing a reset signal. In another embodiment, during run-time monitor 102 may be configured to monitor access of memory 104 by system CPU 106. Similar to the enforcement by monitor 102 of attempted access by controller 110 to target flash memory 108, monitor 102 may be configured to evaluate whether a command by system CPU 106 to be performed on memory 104 is authorized or not. Monitor 102 may be configured to perform corrective action in any suitable manner as described above.

Monitor 102 may be configured to evaluate attempted access by system CPU 106 of memory 104 or by controller 110 of target flash memory 108 according to any suitable criteria. For example, monitor 102 may be configured to define acceptable or unacceptable read, write, or other access regions for each entity that may access a given flash memory. Monitor 102 may be configured to evaluate attempts to erase or write so-called "dirty bits", which indicate that a memory region or cache has been written or needs update. Monitor 102 may be configured to evaluate attempts that produce erase size errors for invalid block sizes, or would access violations such as violations of protection register settings, are for invalid or out-of-range addresses, or would cause a timeout. A mass erase command might be cancelled by monitor 102 regardless of target address.

For SPI busses, such as those between controller 110 and target flash memory 108, mass erase commands may be prevented by monitor 102. A write, read, or erase to an out-of-bound or protection region may be prevented. If contents of target flash memory 108 are corrupted, contents may be restored by monitor 102 from trusted code image 112.

If an attempted read is made to a valid address of target flash memory 108, monitor 102 may be configured to further evaluate the read command. The further evaluation may include checking contents of target flash memory 108 against known, trusted contents that may be stored, for example, in trusted code image 112. The read command performed on target flash memory 108 and the resulting data may be captured by monitor 102. Monitor 102 may place the read data into a shift register, first-in-first-out (FIFO) memory, or other suitable data structure of monitor 102. The read command may be translated so that a similar command or operation may be performed on trusted code image 112. The read command may be performed on trusted code image 112 in another memory such as memory 104. Monitor 102 may compare the data from each of these sources. If the data is not the same, the element making the attempted read of target flash memory 108, such as controller 110, may be reset. Other corrective actions may be taken as needed.

Figure 9A:
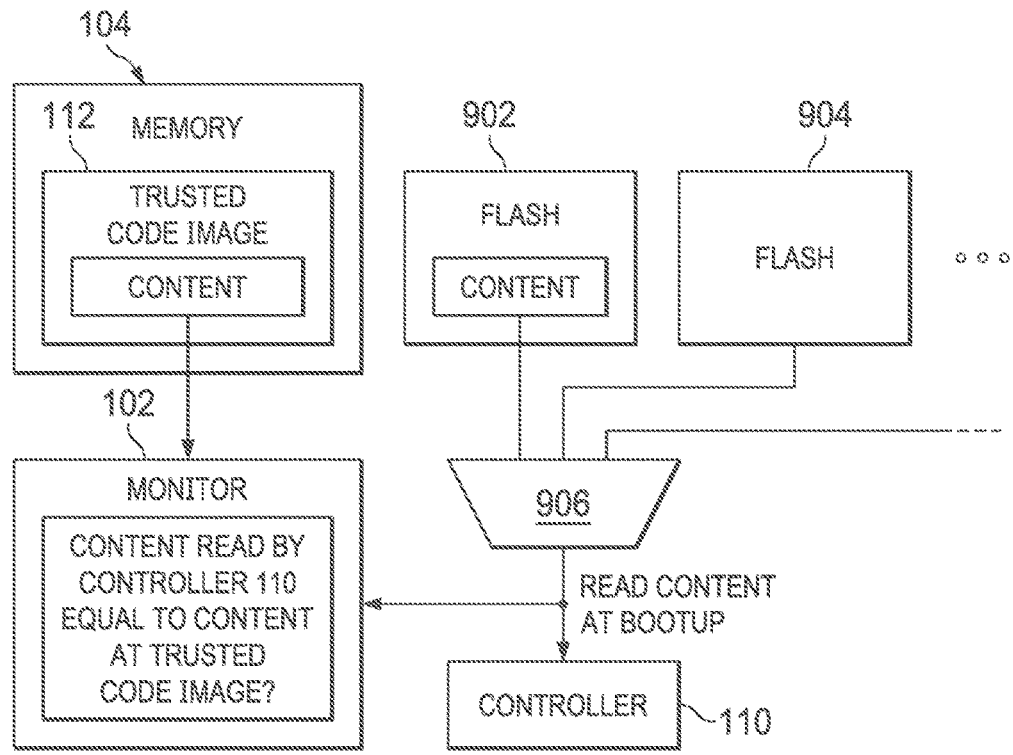
FIGS. 9A and 9B illustrate example configuration of monitor contents of memory, according to embodiments of the present disclosure.
Figure 9B:
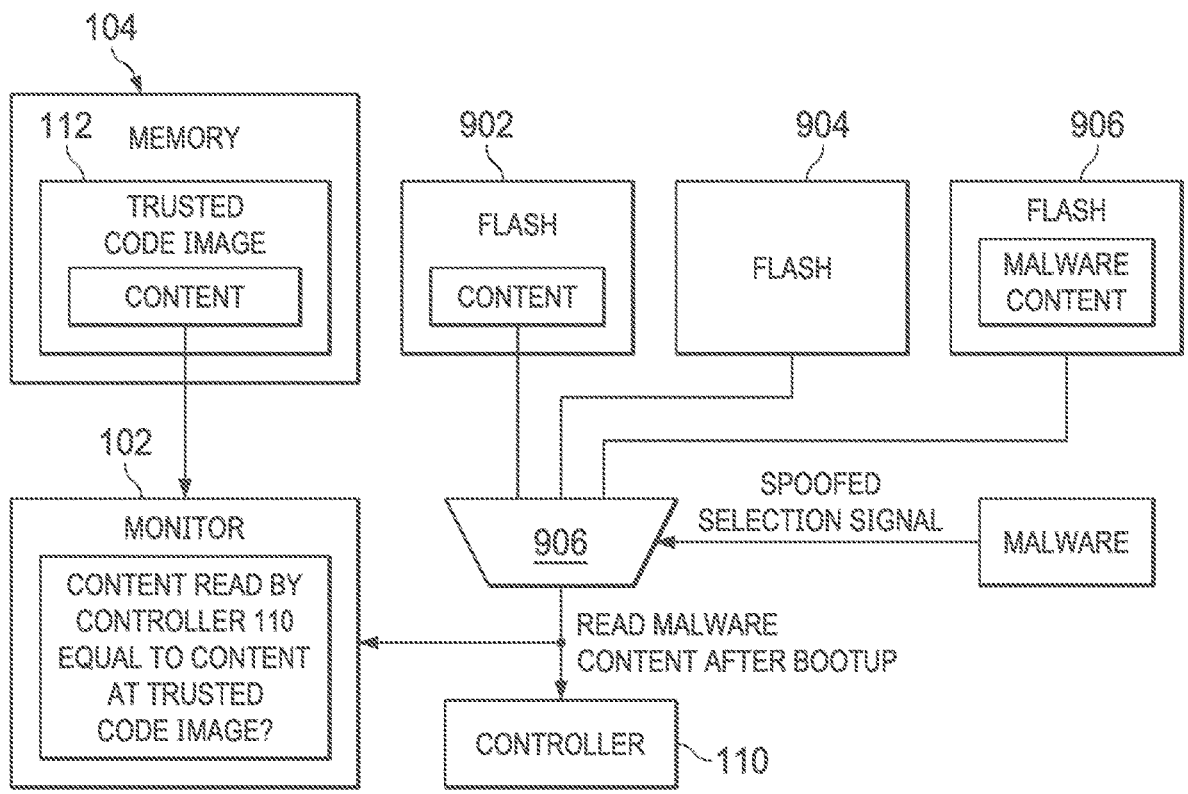

FIGS. 9A and 9B illustrate example configuration of monitor 102 to check contents of target flash 108, according to embodiments of the present disclosure. Monitor 102 may be configured to check contents of target flash 108 at any suitable time. In FIGS. 9A and 9B, controller 110 may be configured to access several different flash memories, such as flash memory 902 and flash memory 904. Flash memory 904 might not be accessed in the specific examples of FIGS. 9A and 9B. A particular flash memory to be read may be selected with, for example, a multiplexer 906 or any other suitable switch, connection, or selection mechanism. Flash 902 may include content, such as controller code 112. The content may also be stored in memory 104 in trusted code image 112.

In FIG. 9A, monitor 102 may read content from a flash memory 902 at bootup. Monitor 102 may compare content in flash memory 902 with a trusted, known copy of such content from trusted code image 112. The comparison may be performed bit-by-bit, byte-by-byte, or based upon a signature or checksum. If the content of flash memory 902 is the same as stored in trusted code image 112, monitor 102 may authenticate the content of flash memory 902. Otherwise, monitor 102 may take corrective action, such as replacing the content in flash memory 902 with the trusted copy from trusted code image 112. Checking memory may be performed periodically, on-demand from a user, or at any other suitable time.

In FIG. 9B, monitor 102 may authenticate content during an attempted read operation made by controller 110. Controller 110 may attempt to read content stored in flash memory 902. However, malware or another malicious agent may have caused, surreptitiously, a different flash memory such as flash memory 906 to be read instead of flash memory 902. This may be performed through a variety of attacks, such as by spoofing a selection signal to multiplexer 906 to cause a read to be made from flash memory 906 instead of flash memory 902. Flash memory 906 may include malware content at the address read by controller 110. Monitor 102, seeing an attempted read from an address designated to store the content in flash memory 902, may authenticate the read transaction. During the read, monitor 102 may read trusted image 112 from memory 104 and compare it to the data read from the flash (which monitor 102 believes to be flash 902). This comparison can be on a bit-by-bit, byte-by-byte, or based upon a signature or checksum. Monitor 102, determining that the content of the read operation is not the same as the content of trusted code image 112, may determine that the content has been compromised or corrupted. Monitor 102 may take corrective action, such as raising an alert. The malware attack shown in FIG. 9B illustrates a benefit for monitor 102 to continually, in real-time, monitor data read from designated areas of memory rather than simply authenticating the data at boot or start-up. The malware attack may arise after the first authentication check.

Figure 10:
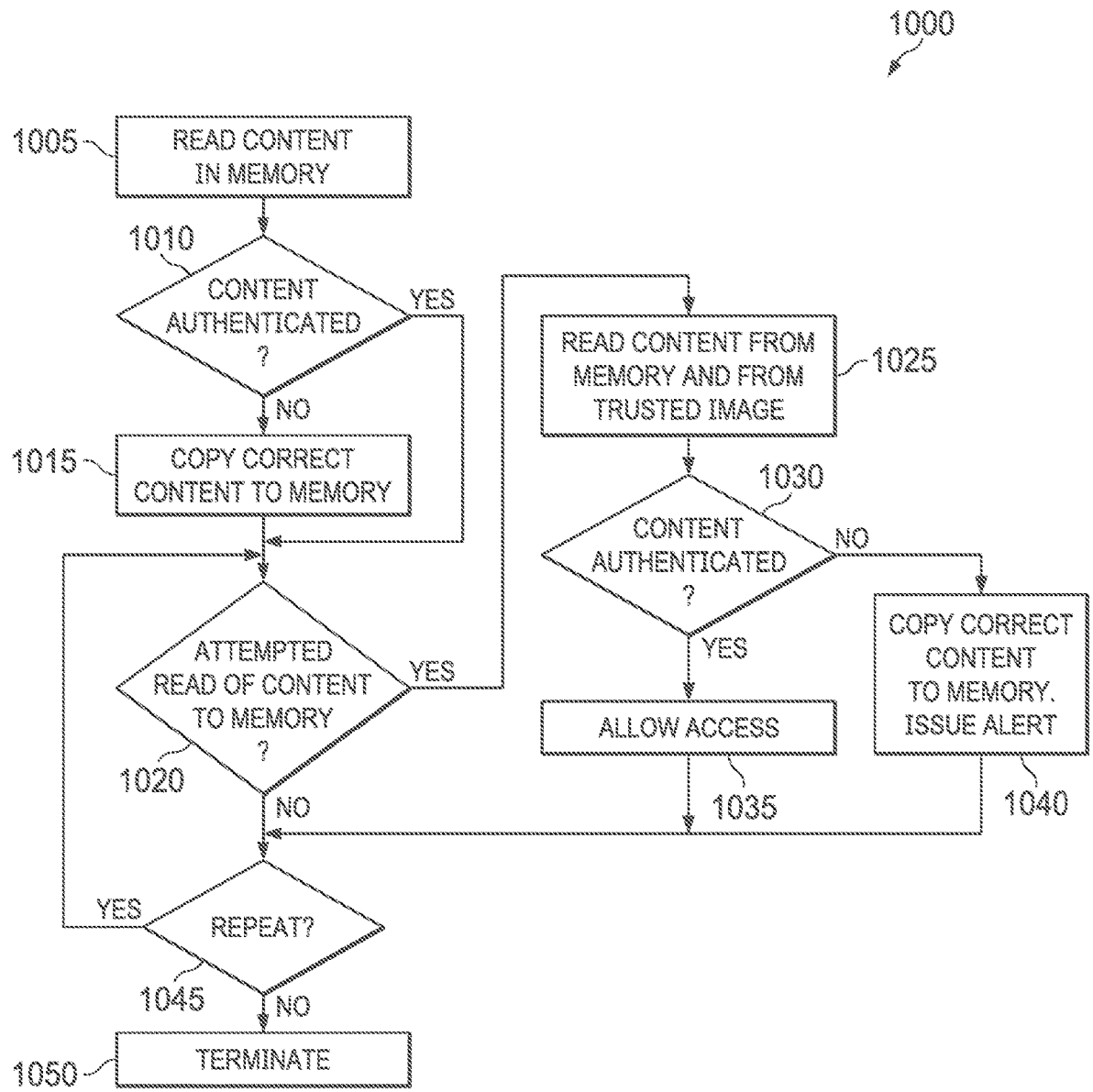
FIG. 10 illustrates an example method for monitoring contents of memory, according to embodiments of the present disclosure.

FIG. 10 is an illustration of an example method 1000 for authenticating content stored in memory, according to embodiments of the present disclosure. Method 1000 may be performed by any suitable mechanism, such as monitor 102. The steps of method 1000 may be performed in any suitable order, and may be initiated at any step, such as step 1005. Various steps of method 1000 may be repeated, omitted, or performed recursively. Multiple instances of method 1000 may be performed in parallel or recursively. Method 1000 may be embodied fully or in part by analog circuitry, digital circuitry, combinatorial logic, circuitry manifested by instructions or a hardware description language, instructions for execution by a processor, or any combination thereof. The instructions may be on a non-transitory, machine-readable medium. The instructions, when loaded and executed by a processor, may cause the processor to perform the functionality of various parts of system 100 such as monitor 102.

At step 1005, content in memory to be checked for authenticity may be read. At step 1010, it may be determined whether the content is authentic. The determination may be made by comparing the content against a trusted copy of the content stored elsewhere. The comparison may be performed in, for example, a bit-by-bit, byte-by-byte, signature, or checksum comparison. If the content is authenticated, method 1000 may proceed to step 1020. If the content is not authenticated, method 1000 may proceed to step 1015.

At step 1015, correct content may be copied from the trusted copy to the memory where the unauthentic content was stored. Method 1000 may proceed to step 1020.

At step 1020, it may be determined whether an attempted read of content has been made from a protected location in memory. If not, method 1000 may proceed to step 1045. If so, method 1000 may proceed to step 1025.

At step 1025, the content may be read from the protected location in memory. At step 1030, it may be determined whether the content as-read from memory is authentic based upon a comparison of the content in the protected location in memory with a known, trusted copy of the content in a trusted image. The comparison may be performed by any suitable comparison such as a bit-by-bit, byte-by-byte, signature, or checksum comparison. If the content is authenticated, method 1000 may proceed to step 1035. If the content is not authenticated, method 1000 may proceed to step 1040.

At step 1035, access to the read content may be allowed. Method 1000 may proceed to step 1045. At step 1040, any suitable corrective action may be access to the read content may be prevented. For example, upon determining that the read content is not authentic, a reset signal may be sent to the entity that attempted to access the content. An authentic copy of the content may be copied to the accessed location in memory. An alert may be issued. Method 1000 may proceed to step 1045.

At step 1045, it may be determined whether method 1000 will repeat. The determination may be based on configuration settings, reset signals or input, or user input, or any other suitable criteria. If method 1000 is to repeat, method 1000 may repeat at, for example, step 1020. Otherwise, at step 1050, method 1000 may terminate.

Embodiments of the present disclosure may include an apparatus. The apparatus includes an interface circuit and a monitor circuit communicatively coupled to the interface circuit. The interface circuit may be implemented by any suitable combination of analog circuitry, digital circuitry, or instructions for execution by a processor. The monitor circuit may be implemented by any suitable combination of analog circuitry, digital circuitry, or instructions for execution by a processor. The monitor circuit is configured to identify a command issued to a memory communicatively coupled to the monitor circuit through the interface circuit. The command may include, for example, a read, write, or erase command. The memory may include a flash memory, or any other suitable memory. The command may originate from any suitable entity. The monitor circuit is further configured to determine whether the command is authorized. The monitor circuit may be configured to determine whether the command is authorized through any suitable criteria. The criteria may be based upon the nature of the command (whether a read, write, or erase), or a destination or address of the command. Different addresses or different commands to a given address may be protected by different criteria. The monitor circuit is configured to determine whether the command is authorized. The monitor circuit is configured to allow the command if the command is authorized, and to take corrective action if the command is not authorized. The monitor circuit may be configured to take any suitable corrective action, such as cancelling the command, issuing resets to the memory or an entity that issued the command, or raising an alert flag or bit to a user or a system.

In combination with any of the above embodiments, the monitor circuit may be configured to operate in a transparent manner between an entity making the command to access the memory and the memory. The transparent operation of the monitor circuit to intercept and evaluate the command may be transparent to the entity making the command. The transparent operation of the monitor circuit to intercept and evaluate the command may be transparent to the memory. The monitor circuit may be configured to receive the command in any suitable manner, such as by a daisy-chain arrangement or by listening to a bus between the entity and the memory.

In combination with any of the above embodiments, the monitor circuit may be further configured to take any suitable action to cancel the command. In order to cancel the command, the monitor circuit may be configured to modify a received chip select signal to yield a modified chip select signal, and send the modified chip select signal to the memory. In order to cancel the command, the monitor circuit may be configured to add or allow an unexpected number of clock pulses to a clock bus used by the memory before completion of the modified chip select signal, alone or in combination with any of the above examples of cancelling the command. The unexpected number of clock pulses may be an odd number of clock pulses or a greater number of clock pulses than are expected by the memory, alone or in combination with any of the above examples of cancelling the command. In order to cancel the command, the monitor circuit may be configured to reset a source of the command before the clock pulse is added to the clock bus used by the memory, alone or in combination with any of the above examples of cancelling the command. In order to cancel the command, the monitor circuit may be configured to reset a source of the command before completion of the modified chip select signal, alone or in combination with any of the above examples of cancelling the command. In order to cancel the command, the monitor circuit may be configured to complete the modified chip select signal after completion of the received chip select signal, alone or in combination with any of the above examples of cancelling the command. In order to cancel the command, the monitor circuit may be configured to complete the modified chip select signal in response to a determination that the command is a write command or an erase command, alone or in combination with any of the above examples of cancelling the command. In order to cancel the command, the monitor circuit may be configured to complete the modified chip select signal before a later chip select signal from a source of the command is received, alone or in combination with any of the above examples of cancelling the command. In order to cancel the command, the monitor circuit may be configured to complete the modified chip select signal before receiving a later chip select signal from the source of the command based on a determination that the command is a read command, alone or in combination with any of the above examples of cancelling the command.

In combination with any of the above embodiments, the monitor circuit may be further configured to identify a read command issued to a memory communicatively coupled to the monitor circuit, compare content from the memory with a trusted copy to determine whether the content from the memory and the trusted copy are identical, and, based on a determination that the content from the memory is not the same as the trusted copy, take corrective action.

In combination with any of the above embodiments, the monitor circuit may include a processor and a non-transitory, machine-readable medium. The medium may include instructions that, when loaded and executed by the processor, cause the monitor circuit to identify the command issued to a memory communicatively coupled to the monitor circuit, determine whether the command is authorized, and cancel the command.

Embodiments of the present disclosure may include methods performed by any of the monitor circuits of the above embodiments.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

What is claimed is:

1. A method, comprising:
   identifying a command issued to a memory;
   determining that the command is not authorized; and
   based on a determination that the command is not authorized, cancelling the command;
   wherein cancelling the command includes resetting a source of the command before issuance of a completed chip select signal to the memory.

2. The method of claim 1, wherein cancelling the command includes:
   delaying or completing a received chip select signal to yield a modified chip select signal; and
   sending the modified chip select signal to the memory.

3. The method of claim 1, wherein cancelling the command includes:
   adding a clock pulse to a clock bus used by the memory before issuance of a completed chip select signal to the memory.

4. The method of claim 3, wherein cancelling the command includes:
   resetting the source of the command before the clock pulse is added to the clock bus used by the memory.

5. The method of claim 1, wherein cancelling the command includes:
   delaying issuance of a completed chip select signal to the memory after completion of a received chip select signal from the source of the command.

6. The method of claim 1, wherein cancelling the command includes:
   delaying issuance of a completed chip select signal to the memory after completion of a received chip select signal from the source of the command, in response to a determination that the identified command is a write command or an erase command.

7. The method of claim 1, wherein cancelling the command includes:
   issuing a completed chip select signal to the memory before completion of a received chip select signal from the source of the command.

8. The method of claim 1, wherein cancelling the command includes:
   receiving a chip select signal from the source; and
   issuing a completed chip select signal to the memory before completion of the chip select signal from the source of the command, based on a determination that the identified command is a read command.

9. An apparatus, comprising:
   an interface circuit; and
   a monitor circuit communicatively coupled to the interface circuit, the monitor circuit to:
      identify a command issued to a memory communicatively coupled to the monitor circuit through the interface circuit, the command issued from a source through the interface circuit to the memory;
      determine that the command is not authorized; and
      based on the determination that the command is not authorized, cancel the command;
      wherein to cancel the command includes to reset the source of the command before issuance of a completed chip select signal to the memory.

10. The apparatus of claim 9, wherein to cancel the command includes:
    to delay or complete a received chip select signal to yield a modified chip select signal; and
    to send the modified chip select signal to the memory.

11. The apparatus of claim 9, wherein to cancel the command includes to add a clock pulse to a clock bus used by the memory before issuance of a completed chip select signal to the memory.

12. The apparatus of claim 11, wherein to cancel the command includes to reset the source of the command before the clock pulse is added to the clock bus used by the memory.

13. The apparatus of claim 9, wherein to cancel the command includes to complete the modified chip select signal after issuance of a completed chip select signal to the memory.

14. The apparatus of claim 9, wherein to cancel the command includes to delay issuance of a completed chip select signal to the memory in response to a determination that the command is a write command or an erase command.

15. The apparatus of claim 9, wherein to cancel the command includes to issue a completed chip select signal to the memory before issuance of an expected completed chip select signal from the source of the command.

16. The apparatus of claim 9, wherein to cancel the command includes to issue a completed chip select signal to the memory before receiving the completed chip select signal from the source of the command based on a determination that the command is a read command.

17. The apparatus of claim 9, wherein the monitor circuit is to:
    identify the command issued to the memory as a read command;
    compare content from the memory with a trusted copy to determine whether the content from the memory and the trusted copy are identical; and
    based on a determination that the content from the memory is not identical to the trusted copy, take corrective action.

18. The apparatus of claim 9, wherein the monitor circuit includes:
    a processor; and
    a non-transitory, machine-readable medium, the medium including instructions, the instructions, when loaded and executed by the processor, cause the monitor circuit to identify the command issued to the memory communicatively coupled to the monitor circuit, determine whether the command is not authorized, and cancel the command.

* * * * *